US011964270B2

(12) United States Patent
Hilgenberg

(10) Patent No.: US 11,964,270 B2
(45) Date of Patent: Apr. 23, 2024

(54) SUCTION DEVICE FOR PIPETTE WITH IMPROVED USABILITY

(71) Applicant: HILGENBERG GmbH, Malsfeld (DE)

(72) Inventor: Ingo Hilgenberg, Malsfeld (DE)

(73) Assignee: HILGENBERG GmbH, Malsfeld (DE)

( * ) Notice: Subject to any disclaimer, the term of this patent is extended or adjusted under 35 U.S.C. 154(b) by 318 days.

(21) Appl. No.: 17/414,638

(22) PCT Filed: Nov. 26, 2019

(86) PCT No.: PCT/EP2019/082505
§ 371 (c)(1),
(2) Date: Jun. 16, 2021

(87) PCT Pub. No.: WO2020/126340
PCT Pub. Date: Jun. 25, 2020

(65) Prior Publication Data

US 2022/0134325 A1 May 5, 2022

(30) Foreign Application Priority Data

Dec. 17, 2018 (EP) .................................... 18213236

(51) Int. Cl.
*B01L 3/02* (2006.01)

(52) U.S. Cl.
CPC ....... *B01L 3/0213* (2013.01); *B01L 2200/026* (2013.01); *B01L 2200/087* (2013.01);
(Continued)

(58) Field of Classification Search
None
See application file for complete search history.

(56) References Cited

U.S. PATENT DOCUMENTS 2,237,213 A * 4/1941 Brown .................... B01L 3/021 422/922
5,787,799 A * 8/1998 Mohrhauser ............ A47J 43/28 222/215

(Continued)

FOREIGN PATENT DOCUMENTS

CA 366854 6/1937
CN 103638997 3/2014

(Continued)

OTHER PUBLICATIONS

Chinese Office Action dated Jul. 4, 2022 for application No. 201980082900 filed Nov. 26, 2019.

(Continued)

*Primary Examiner* — Brandi N Hopkins
*Assistant Examiner* — Nigel H Plumb
(74) *Attorney, Agent, or Firm* — A.C. Entis-IP Ltd; Allan C. Entis

(57) ABSTRACT

The present invention relates to a suction device (1) to be used together with a pipette, in particular a Pasteur pipette. The suction device comprises a base element (2) with the bore (2*a*) for the insertion of a pipette (5), and a body connected to the base element, wherein the interior of the body is hollow, wherein at least the body is made of a flexible material, so that the inner volume of the body (3) is variable. Herein, the base element is formed in a polygonal or elliptic shape, so that the shape of the base element is not round and hence prevents a rolling of the suction device over a lab bench or the like.

21 Claims, 7 Drawing Sheets

(52) U.S. Cl.
CPC ... *B01L 2200/16* (2013.01); *B01L 2300/0832* (2013.01); *B01L 2300/123* (2013.01); *B01L 2400/0481* (2013.01)

(56) References Cited

U.S. PATENT DOCUMENTS

| | | | | |
|---|---|---|---|---|
| 2005/0096610 | A1 | 5/2005 | Marsden | |
| 2006/0118582 | A1* | 6/2006 | Hsu-Yeh | B01L 3/0272 222/633 |
| 2006/0249161 | A1* | 11/2006 | Waters | A61B 10/0045 128/207.18 |
| 2011/0108160 | A1* | 5/2011 | Lee | A45D 34/04 141/24 |

FOREIGN PATENT DOCUMENTS

| | | | |
|---|---|---|---|
| CN | 104415803 | 3/2015 | |
| CN | 101932263 | 12/2020 | |
| EP | 1456344 | 9/2004 | |
| JP | 5485559 | 7/1979 | |
| JP | 2006273393 | 10/2006 | |
| JP | 04030040 | 1/2008 | |
| TW | M298474 | 10/2006 | |
| WO | 0218209 | 3/2002 | |
| WO | 2008143902 | 11/2008 | |
| WO | WO-2008143902 A2 * | 11/2008 | B01L 3/021 |

OTHER PUBLICATIONS

Japanese Office Action dated Oct. 4, 2022 for application No. 2021-535093 filed Nov. 26, 2019.
1 European Examination Report dated Jul. 16, 2020 for application No. 18213236.5 filed Dec. 17, 2018.
European Search Report and Written Opinion dated Mar. 21, 2019 for application No. 18213236.5 filed Dec. 17, 2018.
International PCT Search Report and Written Opinion dated Jan. 13, 2020 for application No. PCT/EP2019/082505 filed Nov. 26, 2019.
Korean Office Action dated Dec. 22, 2023 for application No. 20217017919 filed Nov. 26, 2019.
European Office Action Dated Feb. 27, 2024 for Application No. 18213236.5 filed Dec. 17, 2018.
Anonymous: “Pipette bulbs with roll block in softsilk silicone | MLS”, May 2, 2010.

* cited by examiner

SUCTION DEVICE FOR PIPETTE WITH IMPROVED USABILITY

RELATED APPLICATIONS

The present application is a US National Phase of PCT Application No. PCT/EP2019/082505, filed on Nov. 26, 2019 claiming benefit under 35 U.S.C. 119(a)-(d) of European Application 18213236.5 filed on Dec. 17, 2018, the disclosures of which are incorporated herein by reference.

FIELD OF THE INVENTION

The present application relates to suction devices to be used with pipettes, in particular Pasteur pipettes or pipettes for medical applications.

BACKGROUND

Pipettes are used in various fields and even in daily life, for example for the transfer of liquids in laboratories, in particular in the quantitative analysis, furthermore in pharmacies and hospitals for the mixing of pharmaceutical compositions, and for daily life purposes, for example when delivering a nasal drops or ear drops. Pipettes are usually made of glass, but can also be made of other materials, e.g. plastics. A pipette normally consists of a pipette body (in particular a body of a graduated pipette, which has marks indicating specific volumes on the pipette body, or a Pasteur pipette usually having a tip with a small cross-section and an upper body having a larger cross-section) and furthermore a suction device which is mounted on top of the pipette body, wherein the suction device is usually made of an elastic material, in particular elastomers and/or rubber-like materials. A suction device can be connected with a pipette body in an air-tight and liquid-tight manner, but is also separable again from the pipette body.

The suction device can be squeezed in order to minimize the volume enclosed by the suction device, and then, when releasing the squeezing of the suction device, a sub-pressure is generated within the pipette body, enabling to suck liquid into the pipette.

Regular Pasteur pipettes are generally known in prior art: They include a pipette body made of glass, as mentioned above. On top, there is a suction device, regularly designed in a cylindrical or bulb-shape, usually made of red rubber-like material.

When using such pipette in a laboratory, in particular Pasteur pipettes are often just put on a workbench after use, in some cases even for a potential re-use, for example when the same liquid or a remaining part of the liquid shall be transferred again later.

However, Pasteur pipettes can easily fall off the workbench onto the floor, thereby breaking into many pieces. This is in particular problematic for the case of contaminants or hazardous substances which have been transported with the Pasteur pipette, and even for valuable substances, which might have remained in the pipette for further use. Hence, serious problems can arise.

It is hence an objective technical problem of the present invention to improve the handling and the operability of pipettes, in particular Pasteur pipettes.

This objective technical problem is solved by a pipette according to claim 1. Further advancements and preferred embodiments are defined in the dependent claims.

SUMMARY OF THE INVENTION

The present invention provides the following aspects, subject-matters and preferred embodiments, which respectively taken alone or in combination, further contributing to solving the objective technical problem of the present invention:

1. Suction device for the use with a pipette, in particular a Pasteur pipette, comprising:
   - a base element comprising a polygonal or elliptic shape, the base element provided with a bore for the insertion of a pipette, in particular a Pasteur pipette,
   - a body connected to the base element, wherein the interior of the body is hollow,
   - wherein at least the body is made of a flexible material, so that the inner volume of the body is variable.
2. Suction device according to item 1, wherein the base element has a polygonic shape with at least three edges, preferably at least four edges.
3. Suction device according to item 1, wherein the base element has the shape of a square or a star, wherein the base is preferably formed in the center of the square or star.
4. Suction device according to item 1 or 2 or 3, wherein the flexible material is an elastomer, preferably a silicone,
5. Suction device according to item 4, wherein the flexible material is a silicone suitable for medical applications. Such material can even be sterilized.
6. Suction device according to any one items 4 or 5, wherein the flexible material is translucent.
7. Suction device according to any one of the previous items, wherein the base element and the body are formed integrally.
8. Suction device according to any one of the previous items, wherein the base element and the body and are made of the same material
9. Suction device according to one of the previous items, wherein the bore in the base element has a tapered edge.
10. Suction device according to one of the previous items, wherein ribs are integrally formed with the body.
    The ribs are foreseen to provide a better grip and/or a better haptic feeling of the body by a user.
11. Suction device according to one of the previous items, wherein the outer surface of the body has a rough surface.
    This also provides a better grip and/or a better haptic feeling of the body by a user.
12. Suction device according to one of the previous items, wherein the body comprises a lower body portion, a middle body portion and a top body portion, wherein the lower body portion has a quasi-conical shape and cross-section increasing with the distance from the base portion, the middle body portion has a substantially constant cross-section, and the top body portion has the shape of an ellipsoid segment.
13. Suction device according to any one of the previous items, wherein the middle body portion has an oval, elliptic or polygonal cross-section.
14. Suction device according to any one of the previous items, wherein the base element has a thickness of at least 1 mm and/or of at most 8 mm, preferably a thickness in the range of 2 mm to 6 mm.
    This enables a good handling while inserting a pipette into the suction device. Furthermore, this enables a good stability of the pipette in the suction device when mounted, i.e. an accidental removal of the pipette out of the suction device is prevented.
15. Suction device according to any one of the previous items, wherein the outer contours of the base element protrude from the outer contours of the portion of the lower body portion which is connected to the base element, optionally protrude from the outer contours of the body at its largest outer contour.

16. Suction device according to one of the previous items, wherein the interior volume of the body is designed in a way that the volume of a Pasteur pipette with a length of 150 mm can be sucked, preferably that the volume of a Pasteur pipette with a length of 230 mm can be sucked.

The mentioned Pasteur pipettes are standardized.

17. Suction device according to one of the previous items, wherein the interior volume of the body is designed in a way that the volume of a mini pipette or a micro pipette with a length of 30 to 100 mm can be sucked. Such pipettes also have standardized measures and can for example be used for the transfer of sperm cells and egg cells in laboratories.

18. Suction device according to one of the previous items, wherein the suction device has no valve.

19. Suction device according to one of the previous items, wherein the suction device has no other opening and/or bore except for the bore for inserting the Pasteur pipette, 20. Suction device according to one of the previous items, wherein the base element and the lower body portion together have a height of 18 to 30 mm, preferably 20-25 mm, more preferably approx. 23 mm.

A Pasteur pipette has a portion of approx. 23 mm which is separated from the remaining part of a Pasteur pipette by a groove. This part should at least be partially be covered by a pipette bulb.

21. Suction device according to one of the previous items, wherein the base element is formed as a cap.

22. Suction device according to item 21, wherein the cap is preferably a screw cap with an inner thread or a snap fit cap respectively adapted to be screwed or fitted with a bottle.

23. Kit, comprising a suction device according to one of the previous items, and at least one pipette, in particular a Pasteur pipette, wherein the pipette is insertable into the bore of the base element of the suction device.

24. Kit according to item 23, further comprising a blister package, wherein the suction item and the at least one Pasteur pipette are sealed in the blister package.

25. Kit according to item 23 or 24, wherein the suction item and the at least one Pasteur pipette are sterilized and sealed in the blister package.

26. Kit, comprising a suction device and at least one mini pipette or micro pipette, wherein a Pasteur pipette is insertable into the bore of the base element of the suction device, wherein the pipettes have total lengths of between 30 mm and 100 mm, more preferably 40 and 70 mm, most preferably approximately 60 mm, and/or the tips of the pipettes have an inner diameter of approx. 4 μm-1000 μm.

27. Kit according to item 26, further comprising a blister package, wherein the suction item and the at least one Pasteur pipette are sealed in the blister package.

28. Kit according to item 26 or 27, wherein the suction item and the at least one Pasteur pipette are sterilized and sealed in the blister package.

29. Vial or bottle, preferably glass vial or bottle, provided with a suction device according to any one of items 1 to 22 and a pipette body.

The present invention provides a suction device for the use of a pipette, in particular a Pasteur pipette, which comprises a base element with a polygonal or elliptic shape, wherein the base element is provided with a bore for the insertion of a pipette, in particular a Pasteur pipette, wherein the body is integrally formed with the base element, and the interior of the body is hollow. The body is made of a flexible material and is hence squeezable, so that the inner volume of the body is variable and a liquid can be sucked within the pipette. The particular feature that the base element is provided in a polygonal or elliptic shape ensures that, when the Pasteur pipette body (typically made of glass) is installed in the suction device (made of rubber), the pipette is prevented from accidentally rolling, and hence, if the pipette is deposited somewhere, e.g. on a laboratory bench, liquid material within the pipette is prevented from being spilled, which might contaminate the laboratory bench. It may also be avoided that the pipette rolls over the edge of a table, such as a laboratory bench, and falls down, causing the glass body of the pipette to break and scatter into pieces. This in particular improves the handling of contaminants or hazardous substances which have been transported with the Pasteur pipette, and even the handling of valuable substances, which might have remained in the pipette for further use.

As the connection between the base element and the pipette body is air-tight and liquid-tight, negative pressure in the suction device is hold and can be transferred into the pipette body. This has the further advantage that toxic liquids which have accidentally been sucked into the suction device do not spill out of the suction device.

Preferably, the base element has a polygonal shape with at least three edges, and even more preferably at least four edges. Such shape allows an easy manufacturing with very low costs. The base element can even have a star shape. Furthermore, the flexible material is preferably an elastomer, even more preferably a silicone. It can also be a silicone suitable for medical applications. Such material is very resistant to any liquid which might be sucked into the suction device, and furthermore, such material can even be sterilized for medical applications.

Furthermore, the flexible material of which the suction device is made is preferably transparent. Accordingly, a user can see the sample in the interior of the suction device if liquid is sucked into the suction device.

Additionally, the bore in the base element has preferably a tapered edge, whereby the pipette body made of glass can be smoother and more easily be inserted into the suction device in order to obtain a ready-to-use pipette device.

In addition, the whole suction device is preferably integrally formed. This enables a ready-to-use member without the need to provide any additional means that prevents rolling away of the pipette. This firstly saves time in the laboratory. Secondly, such additional member would have to be mounted fixedly to the pipette, hence deteriorating the handling of the pipette.

Moreover, the whole suction device is more preferably made of one material, enabling low production costs.

Furthermore, the suction device preferably has ribs which are integrally formed with the body, in order to provide a better grip and/or better haptic feeling of the body by a user. More preferably, the outer surface of the body has a rough surface in order to even more improve the haptic feeling and the usability. By such means, it becomes less likely that the suction device slides out of the grip of the user, who might wear gloves which surface might be contaminated with chemicals which have a greasy consistence (e.g. oily substances, lubes, . . . ).

Moreover, the suction device preferably has no valve and/or no other opening and/or bore except for the bore for inserting the pipette. This ensures a simple design of the suction device, and allows an easy and cheap production thereof (e.g. one simple molding step).

Furthermore, the body preferably comprises a lower body portion, a middle body portion and a top body portion, wherein the middle body portion has a substantially constant cross-section with an oval, elliptic or polygonic cross-section. Such flat shape of the suction device also improves the usability of the suction device, as it can be gripped more easily.

Moreover, the outer contours of the base element preferably protrude from the outer contours of the portion of the lower body portion which in connected to the base element. Hence, a good supporting surface is crated, to that the suction device is adapted to stably rest on e.g. a lab bench, so that the danger of rolling away is minimized.

In addition, the fact that the body is preferably made of a lower body portion, a middle body portion and a top body portion generates a large volume, i.e. interior volume of the suction device, which allows the use of the suction device also for larger pipettes. For example Pasteur pipettes can be obtained in a length of 150 mm and 230 mm, these are standard measures on the market. In particular for the Pasteur pipette with a length of 230 mm, the specific shape of the suction device enables the exploitation of the whole volume of the pipette, as the suction device has such large inner volume that liquid can be sucked into the whole inner volume of the pipette body. The inner volume of the body enabling the suction of liquids into a pipette is mainly the volume of the middle body portion.

A further advantageous embodiment of the present invention is a kit comprising suction device and one Pasteur pipette made of glass, wherein the Pasteur pipette is inserted into the bore of the base element of the suction device. In this case, the Pasteur pipette and the suction item can even be sterilized and sealed in a blister package, which can then be easily employed for medical applications, for example in clinical laboratories or in-vitro fertilization.

BRIEF DESCRIPTION OF FIGURES

The disclosure of the following preferred, but non-limiting embodiments of the invention are described in detail by reference to the enclosed drawings.

DETAILED DESCRIPTION

Figure 1:
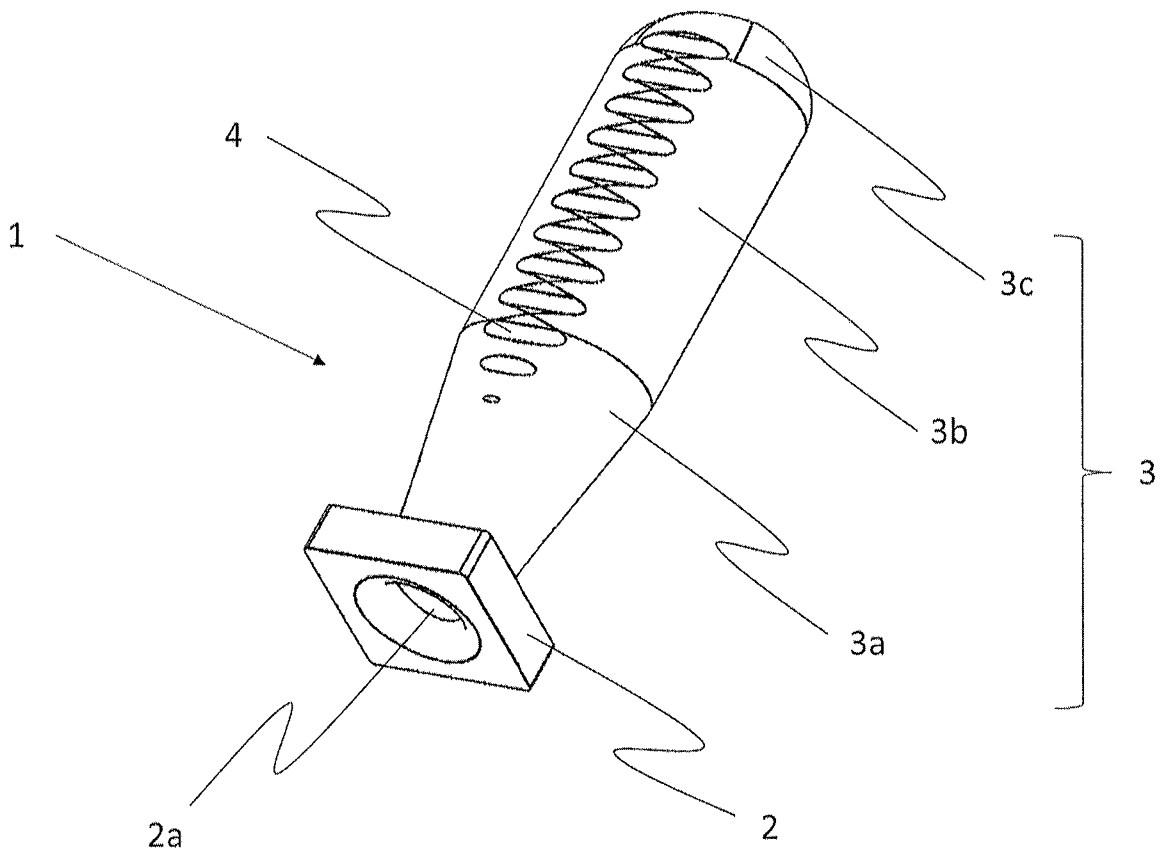
FIG. 1 is an isometric view of a suction device according to a first embodiment of the present invention.

FIG. 1 shows an isometric view of a suction device 1 (according to a first embodiment of the present invention) comprising a base element 2, which has a square base area and a cuboid shape. A bore 2*a* is provided in the middle of the base area of the base element 2, wherein the bore has a tapered edge for a better insertability of a pipette body. The base element 2 is integrally formed with a body portion 3, wherein the body portion 3 comprises a lower body portion 3*a*, a middle body portion 3*b* and a top body portion 3*c*. The lower body portion 3*a* has a quasi-conical shape with a cross-section increasing with the distance from the base portion 2, the middle portion 3*b* has a substantially constant cross-section, and an oval shape, and the top body portion 3*c* has the shape of an ellipsoid segment. The base element 2 and all parts of the body 3 are integrally formed of the same material. It is further illustrated by FIG. 1 that the outer contours of the base element 2 protrude from the outer contours of the portion of the lower body portion 3*a* which in connected to the base element 2. Furthermore, ribs 4 are provided on the body portion 3 on all three portions (lower body portion 3*a*, middle part 3*b* and top body portion 3*c*).

Figure 2:
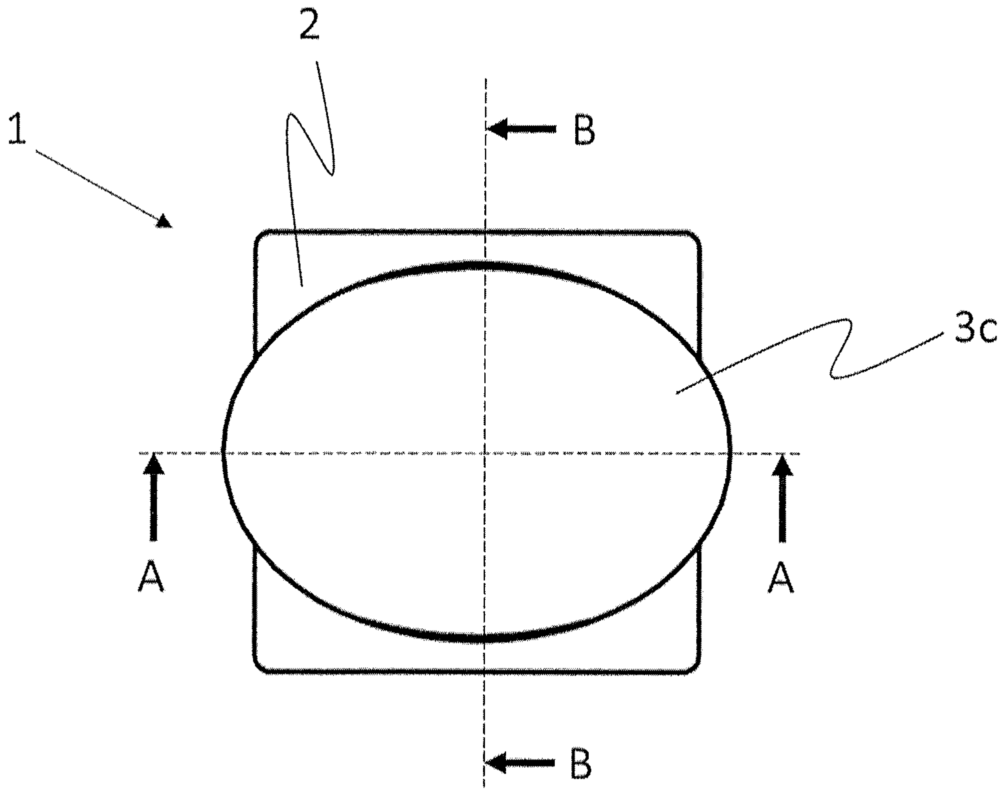
FIG. 2 is a top view of a suction device according to a first embodiment of the present invention.

FIG. 2 shows a top view of the suction device 1, wherein only the top body portion 3*c* and the base element 2 can be seen.

Figure 3A:
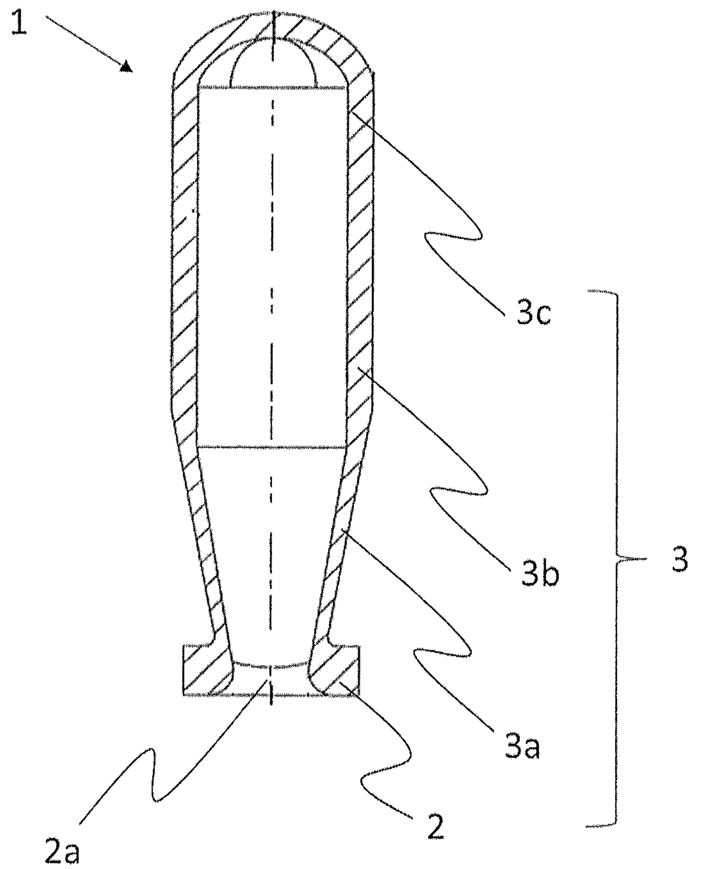
FIG. 3A is a cross-sectional view taken along the line A-A of FIG. 2.

FIG. 3A is a cross-sectional view of the suction device in one direction, wherein the shape of the lower body portion 3*a*, the middle body portion 3*b* and the top body portion 3*c* can exactly be seen. Also the tapering of the bore 2*a* becomes visible from FIG. 3A. In the present embodiment, the bore is not only tapered, but also has rounded edges.

Figure 3B:
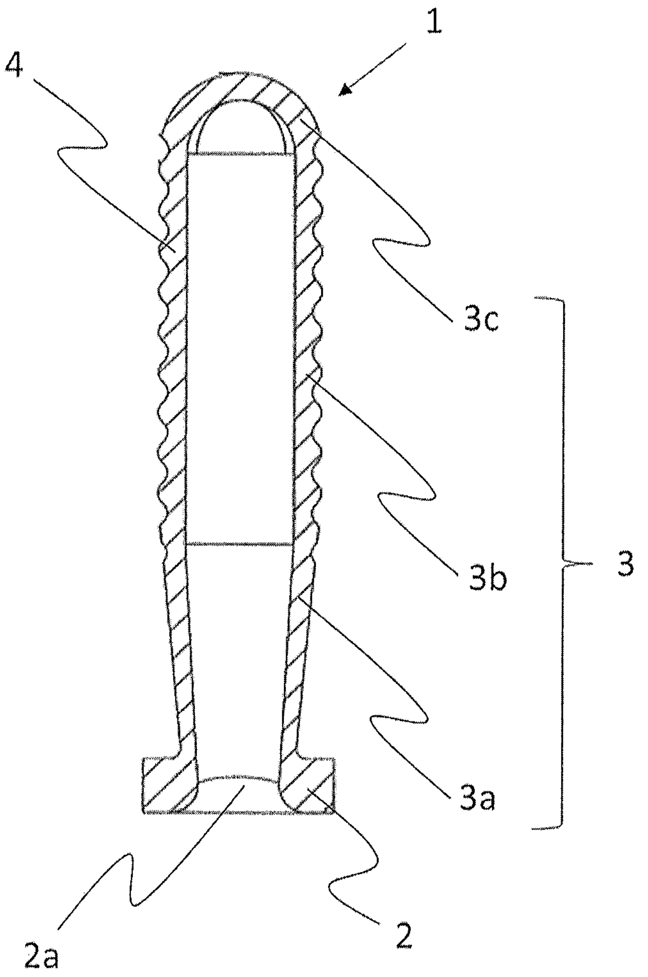
FIG. 3B is a cross-sectional view taken along the line B-B of FIG. 2.

FIG. 3B shows a cross-sectional view in the other direction, wherein all details of FIG. 3A can be seen, but additionally also the ribs 4. These ribs are apparently provided on the longer portion of the oval shape of the body, in order to improve the gripping and the haptic feeling.

Figure 4A:
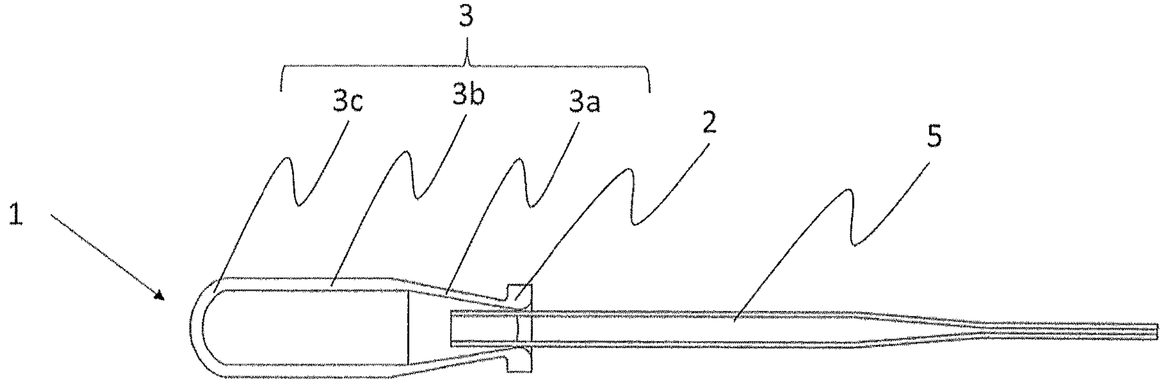
FIG. 4A corresponds to FIG. 3A, however with a pipette body inserted into the suction device.

FIG. 4A shows the same view of the suction device 1 as FIG. 3A, however with a pipette body 5 inserted into the suction device 1.

Figure 4B:
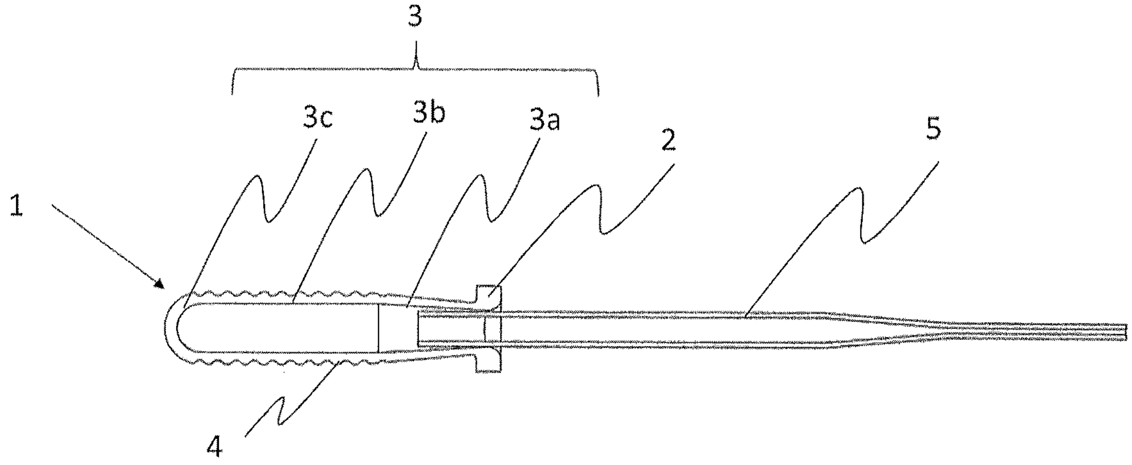
FIG. 4B corresponds to FIG. 3B, however with a pipette body inserted into the suction device.

FIG. 4B shows the same view of the suction device 1 as FIG. 3B, however with a pipette body 5 inserted into the suction device 1.

Figure 5:
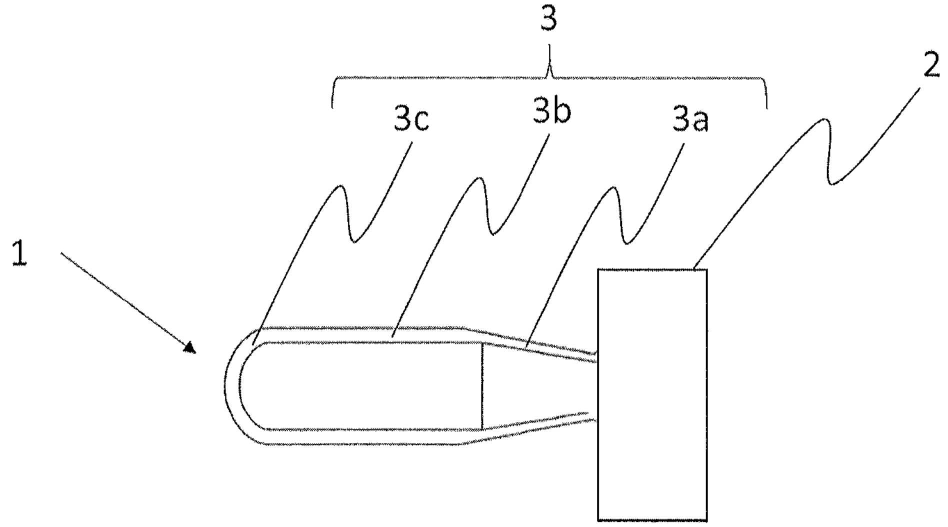
FIG. 5 shows an isometric view of a suction device according to a second embodiment of the present invention.

FIG. 5 shows an isometric view of a suction device 1 (according to a second embodiment of the present invention) comprising a base element 2, which has in its outer contour a square base area and a cuboid shape, the base area hence having a polygonal shape, encompassing the above mentioned advantageous effects. The base element 2 in the second embodiment is in this case a screw cap with an internal thread, also formed in a cuboid shape. The body portion 3 is inserted into the screw cap, wherein the body portion 3 comprises a lower body portion 3*a*, a middle body portion 3*b* and a top body portion 3*c*. The lower body portion 3*a* has a quasi-conical shape with a cross-section increasing with the distance from the base portion 2, the middle portion 3*b* has a substantially constant cross-section, and an oval shape, and the top body portion 3*c* has the shape of an ellipsoid segment. Such suction device 1 according to the second embodiment can be used together with a vial or bottle, preferably a glass vial or bottle.

Figure 6:
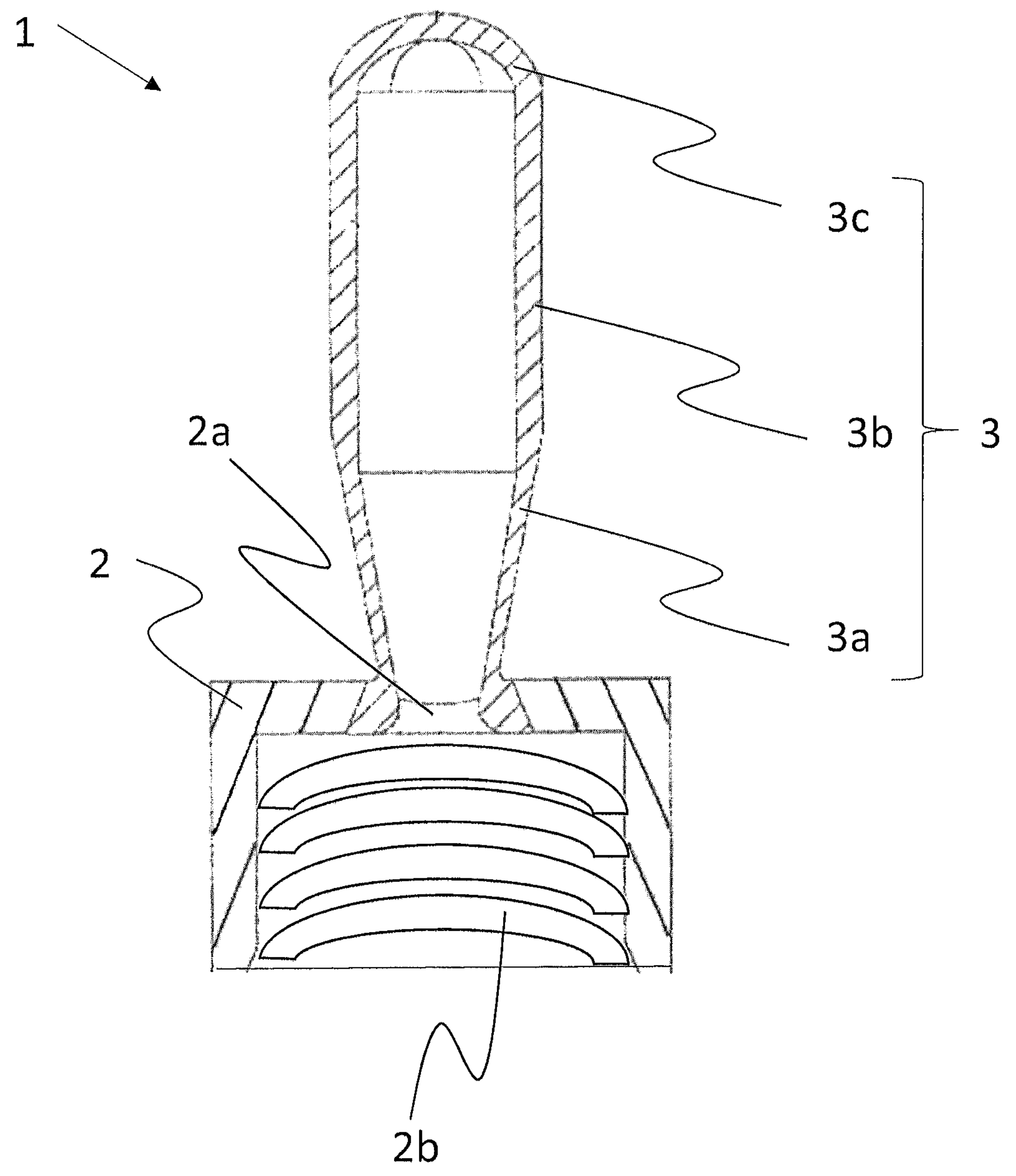
FIG. 6 shows is a cross-sectional view of the suction device according to FIG. 5 (i.e. being a second embodiment of the present invention).

FIG. 6 shows a cross-sectional view of the suction device 1 (according to a second embodiment of the present invention) as depicted in FIG. 5. Herein, it can be seen that the base element 2, which has a square base area and a cuboid outer shape, further has an internal thread 2*b* in order to be connected to a thread of a bottle or the like. Hence, the base element 2 is provided as a screw cap in this second embodiment. Any type of pipette body can be inserted into the suction device 1 through the bore 2*a*.

The present invention is not limited to the above-mentioned embodiments.

For example, the shape of the base element is not limited to a polygonal, elliptic shape or the shape of a square or star—all other shapes are possible, they only must not be round in order to avoid rolling of the suction device on the table. Also composed shapes are possible, for example a combination of a square and a star, or a square or rectangular shape with rounded edges. The effect is to avoid a capability of the suction device itself, and/or or of the combination of a suction device and a pipette body, to roll away because a non-round shape of the base element.

Furthermore, it is also possible that the body portion 3 comprises more parts, for example two or three middle body portions with a different shape—the middle part can be varied in order to vary the volume of the suction device.

Also, the top body portion 3*c* does not necessarily have to be an ellipsoid segment. It can also be a flat plate, a pyramid or a cone. Also, instead of ribs 4, also hemispherical protrusions can be provided over the whole surface of the body portion 3.

Furthermore, the base element 2 can be any form of cap, which is connected with the body 3.

The invention claimed is:

1. A Suction device for the use with a pipette, comprising:

a base element provided with a bore for the insertion of a pipette, a body connected to the base element, wherein the interior of the body is hollow, wherein the body is made of a flexible material, so that the inner volume of the body is variable, wherein the base element comprises a polygonal or elliptic shape, and wherein the base element and the body are integrally formed and made of the same material.

2. The Suction device according to claim 1, wherein the base element has a polygonic shape with at least three edges, or a shape of a star, wherein the bore is formed in the center of the polygon or star.

3. The Suction device according to claim 1, wherein the flexible material is an elastomer.

4. The Suction device according to claim 3, wherein the flexible material is a silicone suitable for use in medical applications.

5. The Suction device according to claim 4, wherein the flexible material is translucent.

6. The Suction device according to claim 1, wherein the bore in the base element has a tapered edge.

7. The Suction device according to claim 1, wherein ribs are integrally formed with the body.

8. The Suction device according to claim 1, wherein the outer surface of the body has a rough surface.

9. The Suction device according to claim 1, wherein the body comprises a lower body portion, a middle body portion and a top body portion, wherein the lower body portion has a quasi-conical shape and cross-section increasing with the distance from the base portion, the middle body portion has a substantially constant cross-section, and/or the top body portion has the shape of an ellipsoid segment.

10. The Suction device according to claim 9, wherein the middle body portion has an oval, elliptic or polygonal cross-section, wherein the base element has a thickness between 1 mm and 8 mm.

11. The Suction device according to claim 9, wherein the base element has a thickness in the range of 2 mm to 6 mm, wherein the base element and the lower body portion together have a height of 18 to 30 mm.

12. The Suction device according to claim 1, wherein the outer contours of the base element protrude from the outer contours of the portion of the lower body portion which is connected to the base element.

13. The Suction device according to claim 1, wherein the suction device has no valve.

14. The Suction device according to claim 1, wherein the base element is formed as a cap, including at least one of a screw cap or a snap fit cap, respectively adapted to be screwed or fitted with a bottle.

15. A Kit, comprising a suction device according to claim 1, and at least one pipette, in particular a Pasteur pipette, wherein a Pasteur pipette is insertable into the bore of the base element of the suction device.

16. The Kit according to claim 15, further comprising a blister package, wherein the suction device and the at least one pipette are sealed in the blister package.

17. The Kit according to claim 15, further comprising a blister package, wherein the suction device and the at least one pipette are sealed in the blister package.

18. A Vial or bottle, provided with a suction device according to claim 1 and a pipette body.

19. The Suction device according to claim 12, wherein the outer contours of the base element protrude from the outer contours of the body at its largest outer contour.

20. The Suction device according to claim 1, wherein the suction device has no outer opening and/or bore except for the bore for inserting the pipette.

21. A suction device for the use with a pipette, comprising:

a base element provided with a bore for the insertion of a pipette; and a body connected to the base element, wherein the interior of the body is hollow;

wherein the body is made of a flexible material, so that the inner volume of the body is variable, and the base element comprises a cross section having a polygonal or elliptic shape, which prevents the suction device from rolling on a surface on which the suction device is placed.

* * * * *